United States Patent

[11] 3,609,307

[72] Inventors Yasushi Totsuka;
    Shin-ichi Kamachi, both of Tokyo, Japan
[21] Appl. No. 36,873
[22] Filed May 13, 1970
[45] Patented Sept. 28, 1971
[73] Assignee Olympus Optical Co., Ltd.
    Tokyo, Japan
[32] Priority May 14, 1969
[33] Japan
[31] 44/36709

[54] DIGITAL MEASURING SYSTEM
    6 Claims, 12 Drawing Figs.
[52] U.S. Cl. .................................................. 235/92 DN,
    235/92 R, 235/92 MP, 235/92 DM, 235/151.11
[51] Int. Cl. ................................................... G06m 3/10
[50] Field of Search ............................................ 235/92 DM,
    92 MP, 92 DN, 92 GC, 92 DE, 151.11; 346/119,
    16, 7.3

[56] References Cited
    UNITED STATES PATENTS
    2,927,735  3/1960  Scuitto ......................... 235/151.11
    3,319,054  5/1967  Kelling ......................... 235/98 MP

Primary Examiner—Maynard R. Wilbur
Assistant Examiner—Robert F. Gnuse
Attorney—Kelman and Berman

ABSTRACT: Digital measuring system for digitally determining the position of the center of two specifically set two measuring points in an object to be detected successively during the measuring operation. The system comprises a digital detecting device for generating pulses during the measuring operation, a counting device for receiving the pulses from the digital detecting device so as to obtain measured value in terms of the number of pulses counted by the counting device, a measuring point detecting device for generating a first pulse when the preceding one of the two measuring points is detected thereby while a second pulse is generated when the succeeding one of the two measuring points is detected, a gate circuit for receiving the pulses from the digital detecting device and the measuring point detecting device, and a pulse decreasing device adapted to erase the alternating pulses in the series of input pulses supplied thereto so that the number of the output pulses of the pulse decreasing device is reduced to half the number of the input pulses thereof. The gate circuit has a first, a second and a third terminal, the first terminal being directly connected to the counting device while the second terminal is connected to the pulse decreasing device which is in turn connected to the counting device.

DIGITAL MEASURING SYSTEM

BACKGROUND OF THE INVENTION

The present invention relates to a digital measuring system, and more particularly to a digital measuring system by which the position of the center of two measuring points such as the position of the centerline of two parallel lines as measured perpendicular thereto and the position of the center of a circle is digitally determined by detecting the two measuring points.

Among the measurements of various mechanical parts, requirements exist to find out the center of each of the parts having symmetrical configuration. For example, it is often required to find out the distance between the center line of a strip-shaped area having a certain width and the center of another strip-shaped area parallel thereto having a certain width or the distance between the centers of the respective two circles.

In the prior art measuring systems, the co-ordinate value of each of the centers are first found out and the distance between the two centers is obtained by the difference in the co-ordinate values of the two centers. Therefore, the problem for finding out the distance between two centers is reduced to the problem to find out the position of the center of two measuring points.

Heretofore, the co-ordinate value of each of the two measuring points such as the boundary lines of the strip-shaped area as measured in the direction perpendicular thereto of a circle is first determined and then the mean value of the two co-ordinate values is calculated in order to find out the position of the center of the two measuring points.

As is well known, a measuring instrument having a digital measuring device has a high efficiency and an accurate performance in the measurement. However, in the measurement of the position of the center of two measuring points as described above, the digital measuring instrument must incorporate therein separate memory devices for storing the respective co-ordinate values so that the stored values are supplied to an operator so as to calculate the mean value of the stored values, thereby rendering the instrument to be complicated and expensive while relatively long time is required to find out the desired value.

The present invention aims at avoiding the above described disadvantages of the prior art digital measuring instrument.

SUMMARY OF THE INVENTION

An object of the present invention is to provide a novel and useful digital measuring system for automatically determining the position of the center of two measuring points with respect to a reference point without delay and without requiring any complicated devices and complicated procedures.

Another object is to provide a novel and useful digital measuring system for automatically setting the origin of the measurement to the center of the two measuring points.

A further object of the present invention is to provide a novel and useful digital measuring system for automatically determining the distance between the centers of the respective two sets of two measuring points.

Still further object of the present invention is to provide a novel and useful digital measuring system for automatically determining the position of the center each of a plurality of sets of two measuring points with respect to a reference point.

The above objects are achieved in accordance with the present invention by a digital measuring system having a digital detecting device which generates pulses during the measuring operation and a counting device which receives the pulses from the digital detecting device so as to count the pulses so that the value to be measured is determined by the number of pulses counted thereby, and characterized by a measuring point detecting device which generates a first pulse when the preceding one of the two measuring points is detected thereby while a second pulse is generated by the measuring point detecting device when the succeeding one of the two measuring points is detected thereby, a gate circuit connected to the output of the digital detecting device and the output of the measuring point detecting device and having a first, a second and a third output terminal, and a pulse decreasing device adapted to erase alternating pulses in the series of input pulses received thereby so as to generate output pulses the number of which is reduced to half the number of the input pulses received thereby, the first output terminal of the gate circuit being directly connected to the input of the counting device while the second output terminal is connected to the counting device through the pulse decreasing device with the third output terminal being kept disconnected from either of the counting device and the pulse decreasing device, the gate circuit being so controlled by the measuring point detecting device that the output pulses from the digital detecting device are directly supplied through the first terminal to the counting device so as to be counted thereby when the measuring operation is commenced at a predetermined reference point with the counting device being reset to zero while the output pulses are switched to be supplied to said counting device through the second terminal and the pulse decreasing device when the first pulse from the measuring point detecting device is supplied to the gate circuit so that the output pulses of the pulse decreasing device are counted by the counting device, the supply of the output pulses from the digital detecting device through the second terminal and the pulse decreasing device to the counting device being stopped by the second pulse generated by the measuring point detecting device and supplied to the gate circuit, thereby permitting the position of the center of the two measuring points to be determined by the number of pulses received and counted by the counting device.

The gate circuit may comprise a first differential circuit connected to the measuring point detecting device, an inverter circuit and a second differential circuit connected in series to the inverter circuit, the inverter circuit being connected to the measuring point detecting device, a first and second flip-flop circuits each having a setting and a resetting input terminals and a first and second output terminals so that an output is generated at the first output terminal when an input is applied to the setting input terminal with the second output terminal kept zero while an output is generated at the second output terminal and the output at the first output terminal is made zero when an input is applied to the resetting input terminal, the setting input terminal of the first flip-flop circuit being connected to the output of the first differential circuit while the resetting input terminal thereof is connected to the output of the second differential circuit, the setting input terminal of the second flip-flop circuit being connected to the output of the second differential circuit, resetting means connected to the resetting input terminal of each of the first and second flip-flop circuits, and a first and second AND circuits, the second output terminal of the first flip-flop circuit being connected to the first and second AND circuits while the first output terminal of the second flip-flop circuit is connected to the second AND circuit and the second output terminal thereof is connected to the first AND circuit, the output of the first AND circuit being connected to the first output terminal of the gate circuit and the output of the second AND circuit is connected to the third output terminal thereof while the output of the first output terminal of the first flip-flop circuit being connected to the second output terminal of the gate circuit.

In accordance with the present invention, the pulses from the digital detecting device are first supplied to the third terminal of the gate circuit before the first pulse is supplied from the measuring point detecting device to the gate circuit so that no pulses are supplied to either of the counting device and the pulse decreasing device and the pulses from the digital detecting device are switched to be supplied to the second terminal when the preceding one of the first pulse from the measuring point detecting device is supplied to the gate circuit upon detection of the preceding one of the two measuring points by the measuring point detecting device so that the output pulses from the pulse decreasing device are supplied to the counting device so as to be counted thereby until the second pulse is supplied from the measuring point detecting device to the gate circuit upon detection of the succeeding one of the two measuring points at which time the output pulses from the digital detecting device are switched to be supplied to the first terminal of the gate circuit so that the output pulses are directly supplied to the counting device so as to be counted thereby, thus permitting the center of the two measuring points to be made the origin in the measurement.

The digital measuring system for determining the distance between the centers of the respective first and second sets of two measuring points in accordance with the present invention is characterized in that the gate circuit is so controlled by the measuring point detecting device that the output pulses from the digital detecting device are switched to be supplied to the second output terminal of the gate circuit when the preceding one of the two measuring points in the second set is detected by the measuring point detecting device so as to generate a first pulse therein to be supplied to the gate circuit after the center of the two measuring points of the first set has been set as the origin of the measurement in accordance with the above described procedure and the output pulses from the digital counting device have begun to be counted directly by the counting device after the succeeding one of the two measuring points in the first set has been detected, the output pulses from the digital detecting device being switched to be supplied to the third output terminal of the gate circuit when the succeeding one of the two measuring points in the second set is detected, thereby stopping the supply of the output pulses from the digital detecting device to either of the counting device and the pulse decreasing device so that the counting of the pulses by the counting device is terminated when the number of pulses indicative of the center of the two measuring points in the second set has been supplied to the counting device by virtue of the fact that the number of pulses supplied to the counting device through the pulse decreasing device within the range between the two measuring points in the second set is reduced to half the number of pulses from the digital detecting device within that range.

The digital measuring system for determining the position of the center each of a plurality of sets of two measuring points in accordance with the present invention is characterized in that the system comprises a further counting device connected to the digital detecting device and adapted to count the output pulses from the digital detecting device at all times during the measuring operation regardless of the operation of the gate circuit, a counting control circuit connected to the above further counting device and the counting device controlled by the gate circuit so as to transmit the content of the further counting device to the counting device controlled by the gate circuit at a given time, a register control circuit with the inputs thereof being connected to the output of the counting device controlled by the gate circuit and the output of the second differential circuit while one of the outputs is connected to the counting control circuit, a registering device connected to the other of the outputs of the register control circuit for storing the content of the counting device controlled by the gate circuit, and a recording printer device connected to the registering device for recording the content of the registering device, the gate circuit and the register control circuit being so controlled by the measuring point detecting device that the output pulses from the digital detecting device are supplied through the first output terminal of the gate circuit to the counting device controlled by the gate circuit with the further counting device being supplied with output pulses directly from the digital detecting device when the measuring operation is commenced at a predetermined reference point with the counting device and the further counting device being reset to zero, the output pulses from the digital detecting device being switched to be supplied through the second output terminal of the gate circuit and the pulse decreasing device to the counting device while the further counting device is supplied with the output pulses directly from the digital detecting device when the first pulse is supplied from the measuring point detecting device to the gate circuit upon detecting the preceding one of the two measuring points of the first set in the plurality of sets, the output pulses from the digital detecting device being switched to be supplied directly to the counting device through the first output terminal of the gate circuit while the register control circuit is actuated simultaneously with the switching of the output pulses from the second output terminal to the first output terminal so as to transmit the content of the counting device to the registering device so as to store the same therein and record the same in the recording printer device when the second pulse is applied to the gate circuit from the measuring point detecting device upon detection of the succeeding one of the two measuring points in the first set, the register control circuit further supplying to the counting control circuit a demand upon completion of the storing of the content of the counting device in the registering device so as to transmit the content of the further counting device to the counting device controlled by the gate circuit, the content recorded in the recording printer device being indicative of the position of the center of the two measuring points in the first set of the plurality of sets while the content transmitted from the further counting device to the counting device controlled by the gate circuit is indicative of the position of the succeeding one of the two measuring points of the first set thereby permitting the position of the center of two measuring points in the respective succeeding sets to be successively indicated in the recording printer device by repeating the above procedure.

The present invention is applicable to a measuring instrument having a digital measuring device of a length or an angle and a digital detecting device adapted to generate electric pulses during the measuring operation.

As to the measuring device, various means are well known such as utilizing moire fringes, inductions and magnetic gratings. As to the detecting device, various means are well-known such as a photoelectric microscope provided with photoelectric transducers.

BRIEF DESCRIPTION OF THE DRAWINGS

FIG. 3 is a diagram showing the process for determining the position of the center of an are having symmetrical configuration;

DETAILED DESCRIPTION OF THE PREFERRED EMBODIMENTS

Figure 1:
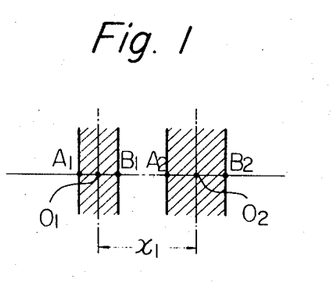
FIG. 1 is a diagram showing the process for determining the distance between the center of a strip-shaped area having symmetrical configuration and the center of another strip-shaped area having symmetrical configuration and arranged in parallel to the first mentioned area.

In FIG. 1, the center distance $x_1$ is obtained by first determining the co-ordinate values of the centers $O_1$, $O_2$ of the respective areas having symmetrical configuration the boundaries of which are indicated by $A_1$, $B_1$; $A_2$, $B_2$, respectively, and then subtracting the co-ordinate value of center $O_1$ from the co-ordinate value of center $O_2$ so that distance $x_1$ is obtained.

Figure 2:
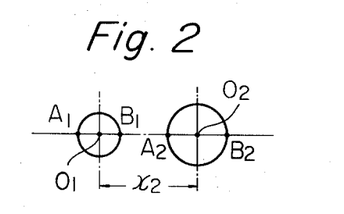
FIG. 2 is a diagram showing the process for determining the distance between the centers of two circles.

In the similar manner, center distance $x_2$ between centers $O_1$, $O_2$ of two circles the boundaries of which are indicated by $A_1$, $B_1$; $A_2$, $B_2$, respectively, as shown in FIG. 2 is obtained by subtracting the co-ordinate value of center $O_1$ from the co-ordinate value of center $O_2$.

Therefore, the problem for obtaining the center distance described above is reduced to obtain the co-ordinate value of center $O_2$.

Therefore, the problem for obtaining the center distance described above is reduced to obtain the co-ordinate values of the centers.

Heretofore, the center of two measuring points such as boundaries $A_1$, $B_1$ (or $A_2$, $B_2$) is determined by first obtaining co-ordinate values $a_1$, $b_1$ or $a_2$, $b_2$ of the respective boundaries $A_1$, $B_1$ or $A_2$, $B_2$ and then obtaining the mean value $a_1+b_1/2$ or $a_2+b_2/2$.

As previously described, the procedure for obtaining the mean value $a_1+b_1/2$ or $a_2+b_2/2$ from the respective co-ordinate values $a_1$, $b_1$ or $a_2$, $b_2$ requires separate memory circuits for storing the co-ordinate values $a_1$, $b_1$ or $a_2$, $b_2$ and an operating device for calculating the mean value $a_1+b_1/2$ or $a_2+b_2/2$ thereby rendering the measuring instrument to be complicated and expensive and requiring relatively long time for obtaining the desired value.

Figure 3:
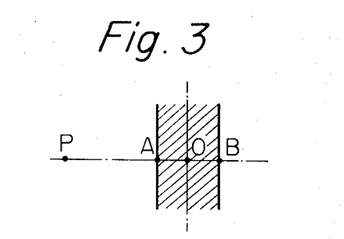
FIG. 3 is a diagram showing the process for determining the position of the center of an area having symmetrical configuration.
Figure 4:
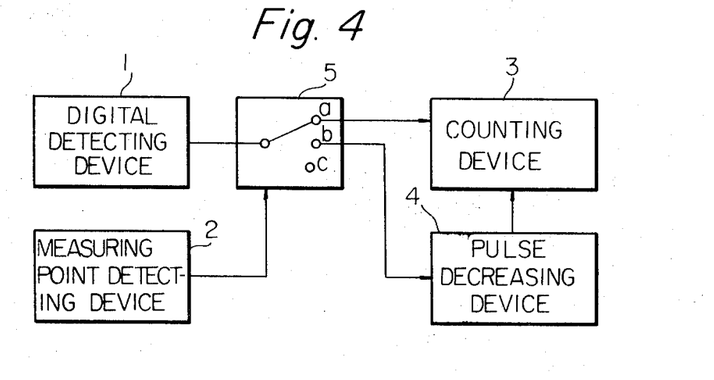
FIG. 4 is a block diagram showing the basic construction of the digital measuring system in accordance with the present invention.

In accordance with the present invention, the position of center O of an area bounded by A, B with respect to point P as shown in FIG. 3 is determined by a digital measuring system schematically shown in FIG. 4. The system of FIG. 4 comprises a digital detecting device 1 adapted to generate digital counting pulses during the measuring operation, a measuring point detecting device 2 adapted to generate a first pulse when the preceding one of the two measuring points, i.e., point A in this case, is detected by measuring point detecting device 2 and generate a second pulse when the succeeding one of the two measuring points, i.e., point B in this case, is detected, a gate circuit 5 connected to the outputs of digital detecting device 1 and measuring point detecting device 2, gate circuit 5 having a first output terminal $a$, a second output terminal $b$ and a third output terminal $c$, a digital counting device 3 constructed by transistor flip-flop circuits, for example, and connected to first output terminal $a$, and a pulse decreasing device 4 with its input connected to second output terminal $b$ and with its output connected to counting device 3. Pulse decreasing device 4 is so constructed that alternating pulses in the input pulses supplied to pulse decreasing device 4 are erased so that the number of output pulses generated by pulse decreasing device 4 is reduced to half the number of the input pulses supplied to pulse decreasing device 4. Pulse decreasing device 4 may be constructed by a flip-flop circuit which is triggered by the counting pulses from digital detecting device 1 so as to differentiate the variation in the output thereof. Gate circuit 5 is so controlled by measuring point detecting device 2 that the pulses from digital detecting device 1 are supplied to first output terminal $a$ when the measuring operation is commenced at reference point P with counting device 3 being reset to zero so that the pulses from digital detecting device 1 are directly counted by counting device 3, but, when the first pulse generated in measuring point detecting device 2 upon detection of point A is supplied to gate circuit 5, gate circuit 5 is switched so as to supply the pulses from digital detecting device 1 to second output terminal $b$ so that the pulses are supplied to pulse decreasing device 4 which in turn supplies its output pulses to counting device 3, which, when the second pulse generated in measuring point detecting device 2 upon detection of point B is supplied to gate circuit 5, gate circuit 5 is further switched so as to supply the pulses from digital detecting device 1 to third output terminal $c$ which has no connection to either of counting device 3 and pulse decreasing device 4 so that the supply of the pulses from digital detecting device 1 to counting device 3 directly or through pulse decreasing device 4 is stopped.

Therefore, the number of pulses supplied to counting device 3 through pulse decreasing device 4 during the measurement within the range from point A to point B is reduced to half the number of pulses generated by digital detecting device 1 within that range while the number of pulses generated by digital detecting device 1 during the measurement within the range between reference point P and point A is directly counted by counting device 3. Thus, the indication of counting device 3 corresponds to $$\overline{PA}+(AB/2)=\overline{PO}$$

Therefore, the position of center $O$ of points $A$, $B$ is directly indicated by counting device 3.

Figure 5:
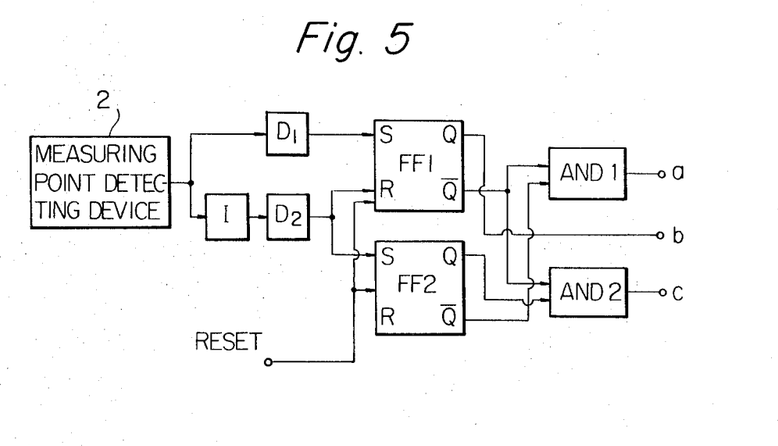
FIG. 5 is a block diagram showing an embodiment of the gate circuit incorporated in the digital measuring system shown in FIG. 4.

FIG. 5 shows an embodiment of gate circuit 5 of FIG. 4. Gate circuit 5 comprises a first differential circuit $D_1$, an inverter circuit I and a second differential circuit $D_2$ connected in series to inverter circuit I, the inputs of first differential circuit $D_1$ and inverter circuit I being connected to the output of measuring point detecting device 2, a first flip-flop circuit FF1 and a second flip-flop circuit FF2 each having a setting input terminal S, a resetting input terminal R, a first output terminal Q and a second output terminal $\overline{Q}$, setting input terminal S of first flip-flop circuit FF1 being connected to the output of first differential circuit $D_1$ while the output of second differential circuit $D_2$ is connected to resetting input terminal R of first flip-flop circuit FF1 and setting input terminal S of second flip-flop circuit FF2, resetting means connected to resetting input terminal R each of first and second flip-flop circuits FF1, FF2, and a first and a second AND circuit AND1, AND2, first output terminal Q of first flip-flop circuit FF1 being directly connected to second output terminal $b$ of gate circuit 5 while second output terminal $\overline{Q}$ of first flip-flop circuit FF1 is connected to the input each of first and second AND circuits AND1, AND2, first output terminal Q of second flip-flop circuit FF2 being connected to the input of second AND circuit AND2 while second output terminal $\overline{Q}$ of second flip-flop circuit FF2 is connected to first AND circuit AND1, the output of first AND circuit AND1 being connected to first output terminal $a$ of gate circuit 5 while the output of second AND circuit AND2 is connected to third output terminal $c$ of gate circuit 5.

Each of first and second flip-flop circuit FF1, FF2 is so operated that an output is generated at first output terminal Q with second output terminal $\overline{Q}$ being held zero output when an input is supplied to setting input terminal S until an input is applied to resetting input terminal R at which time the flip-flop circuit is reset so that the output at first output terminal Q is rendered to be zero and an output is generated at second output terminal $\overline{Q}$.

In this case, measuring point detecting device 2 is adapted to generate an output in the rectangular form beginning at point A with a rise to be used as the first pulse and terminating at point B with a descent to be used as the second pulse.

Figure 6:
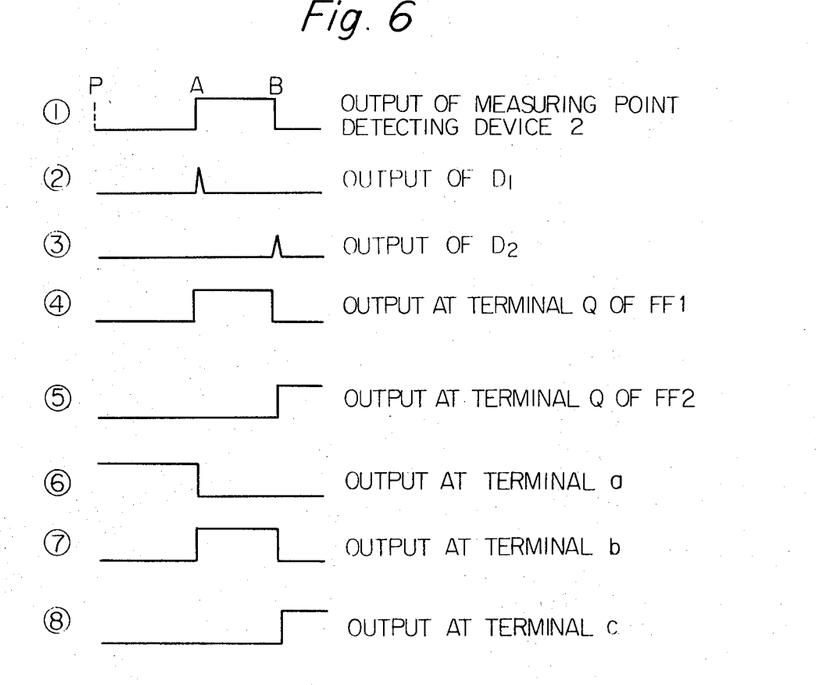
FIG. 6 is a diagram showing the various waveforms of the outputs generated in various elements used in the gate circuit of FIG. 5.

The operation of gate circuit 5 shown in FIG. 5 will be described below with reference to FIG. 6. At the beginning of the measuring operation, both flip-flop circuits FF1, FF2 are reset by resetting means at reference point P so that first AND circuit AND1 is rendered to be operative while second AND circuit AND2 is kept inoperative. Therefore, output pulses from digital detecting device 1 are directly supplied to counting device 3 through first output terminal a so as to be counted thereby, when the measurement is commenced. When point A is detected and a first pulse, the rise in the rectangular form output in this case, is supplied from measuring point detecting device 2 to first differential circuit $D_1$, first flip-flop circuit FF1 is set by the pulse from first differential circuit $D_1$ while second differential circuit $D_2$ is held inoperative by virtue of the interposition of inverter circuit $I_2$ between measuring point detecting device 2 and second differential circuit $D_2$ thereby keeping second flip-flop circuit FF2 in the reset condition. Thus, an output is generated at first output terminal Q of first flip-flop circuit FF1 so that the pulses from digital detecting device 1 are supplied to second output terminal b connected to pulse decreasing device 4 while the output at second output terminal $\bar{Q}$ of first flip-flop circuit FF1 is extinguished so that first AND circuit AND1 is rendered to be inoperative thereby extinguishing the output first output terminal. Therefore, the output of pulse decreasing device 4 is applied to counting device 3 after point A has been detected. When point B is detected by measuring point detecting device 2 so as to supply a second pulse, the descent in the rectangular form output in this case, to gate circuit 5, a pulse is generated by second differential circuit $D_2$ by virtue of converter circuit I so that first flip-flop circuit FF1 is reset while second flip-flop circuit FF2 is set. Thus, the output of second output terminal $\bar{Q}$ of first flip-flop circuit FF1 is applied to both AND circuits AND1, AND2 while the output of first output terminal Q of second flip-flop circuit FF2 is applied to second AND circuit AND2 thereby rendering second AND circuit AND2 to be operative so as to supply the output thereof to third output terminal c which has no connection to either of counting device 3 and pulse decreasing device 4 while first AND circuit AND1 is kept inoperative so that the counting by counting device 3 is stopped and the indication of counting device 3 is made to correspond to the position of center D of points A, B with respect to reference point P.

By modifying the above procedure, the origin of the measurement can be automatically set to center O of points A, B in FIG. 3 regardless of the fact that the measurement is commenced at any point preceding point A. In this case, counting device 3 is reset to zero and gate circuit 5 is switched so as to generate an output at third output terminal c prior to the commencement of the measuring operation at any point preceding point A such as point P. Thus, no pulses are supplied to counting device 3 during the measuring operation until point A is detected by measuring point detecting device 2 at which time a first pulse is applied to gate circuit 5 and it is switched to generate an output at second output terminal b so as to supply pulses to pulse decreasing device 4. Thus, counting device 3 is supplied with output pulses from pulse decreasing device 4 so as to count the same. When point B is detected and a second pulse is applied to gate circuit 5, it is further switched so as to generate an output at first output terminal a so that pulses from digital detecting device 1 are directly supplied to counting device 3 so as to be counted thereby. Since the number of pulses counted by counting device 3 within the range between points A, B is reduced to half the number of pulses corresponding to that range by virtue of pulse decreasing device 4 and the pulses from digital detecting device 1 are directly supplied to counting device 3 after the detection of point B while no pulses are applied to counting device 3 prior to the detection of point A, the origin of the measurement is automatically set to center 0 of points A, B.

Figure 7:
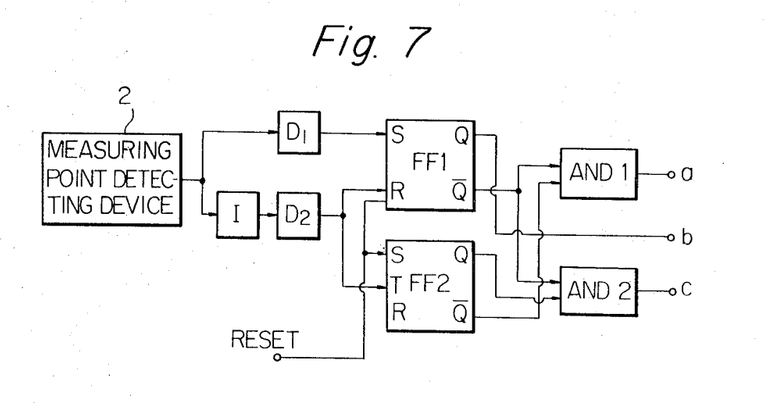
FIG. 7 is a block diagram showing another embodiment of the gate circuit used in the digital measuring system of the present invention.

FIG. 7 shows a further modification of gate circuit 5 of FIG. 5 by which the distance between the center of a first set of two measuring points and the center of a second set of two measuring points is automatically determined regardless of the fact that the measuring operation is commenced at any point which precedes the preceding one of the two measuring points of the first set. The gate circuit of FIG. 7 is similar to that of FIG. 5 except that an inverting input terminal T is provided in second flip-flop circuit FF2 and the output of second differential circuit $D_2$ is connected to inverting input terminal T instead of setting input terminal S as in the case of FIG. 5 and that resetting means is connected to setting input terminal S of second flip-flop circuit FF2 instead of resetting input terminal R as is the case of FIG. 5. Inverting input terminal T is adapted to operate such that second flip-flop circuit FF2 is inverted each time an output is applied to inverting input terminal T. In other words, the output at first output terminal Q of second flip-flop circuit FF2 is extinguished while an output is generated at second output terminal $\bar{Q}$ and vice versa each time an input is applied to inverting input terminal T.

In operation of gate circuit 5 of FIG. 7, counting device 3 is reset to zero while gate circuit 5 is set so as to generate an output at third output terminal c so as to be ready for commencement of the measuring operation at a point preceding the preceding one of the two measuring points of the first set, i.e., a point preceding point $A_1$ in FIG. 1 or 2. Gate circuit 5 of FIG. 7 is so operated that:

a. the output of gate circuit 5 is switched to be supplied to second output terminal b, when point $A_1$ is detected,
b. the output is switched to be supplied to first output terminal a, when point $B_1$ is detected,
c. the output is switched again to be supplied to second output terminal b, when point $A_2$ is detected,
d. the output is finally switched to be supplied to third output terminal c.

Thus, the content of counting device 3 obtained by the above procedure corresponds to $$\tfrac{1}{2}\,\overline{A_1B_2} + \overline{B_1A_2} + \tfrac{1}{2}\,\overline{A_2B_2} = \overline{0_1 0_2}$$

Therefore, the center distance $\overline{0_1 0_2}$ is automatically determined.

Figure 8:
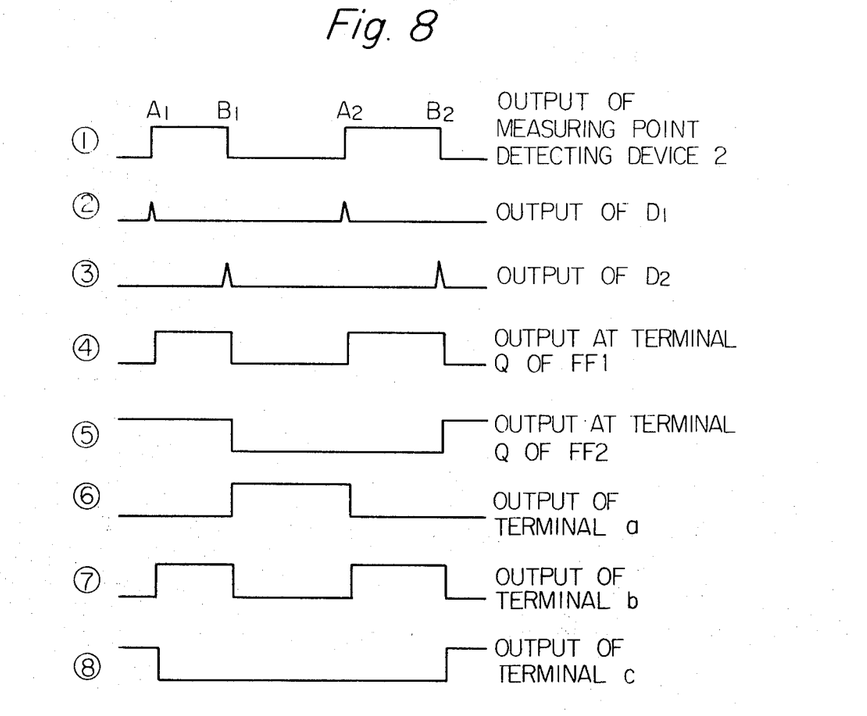
FIG. 8 is a diagram showing various waveforms of the outputs generated in various elements used in the gate circuit of FIG. 7.

The above procedure will be described in detail with reference to FIG. 8. At the beginning of the measurement, first flip-flop circuit FF1 is reset while second flip-flop circuit FF2 is set by resetting means. Then, the operation proceeds in the following steps in which "0" indicates no output while "1" indicates that an output is generated. Prior to reaching point $A_1$:

| $D_1$ | 0, | $D_2$ | 0 |
|---|---|---|---|
| Q of FF1 | 0, | Q of FF1 | 1 |
| Q of FF2 | 1, | Q of FF2 | 0 |
| AND1 | 0, | AND2 | 1 |
| terminal a | 0, | terminal b | 0 |
| terminal c | 1 | | |

No pulses from digital detecting device 1 are applied to counting device 3.

At point $A_1$:

| $D_1$ | 1, | $D_2$ | 0 |
|---|---|---|---|
| Q of FF1 | 0→1, | $\bar{Q}$ of FF1 | 1→0 |
| Q of FF2 | 1→1, | $\bar{Q}$ of FF2 | 0→0 |
| AND1 | 0→0, | AND2 | 0→0 |
| Terminal a | 0→0, | Terminal b | 0→1 |
| Terminal c | 1→0 | | |

Thus, the pulses from digital detecting device 1 are applied to pulse decreasing device 4 which in turn supplies the output pulses thereof to counting device 3 after point $A_1$ has been detected.

At point $B_1$:

| $D_1$ | 0, | $D_2$ | 1 |
|---|---|---|---|
| Q of FF1 | 1→0, | $\bar{Q}$ of FF1 | 0→1 |
| Q of FF2 | 1→0, | $\bar{Q}$ of FF2 | 0→1 |
| AND1 | 0→1, | AND2 | 0→0 |
| Terminal a | 0→1, | Terminal b | 1→0 |
| Terminal c | 0→0 | | |

Thus, the output pulses from digital detecting device 1 are directly supplied to counting device 3 through terminal a so as to be counted thereby after point $B_1$ has been detected.

At point $A_2$:

| $D_1$ | 1, | $D_2$ | 0 |
|---|---|---|---|
| Q of FF1 | 0→1, | $\overline{Q}$ of FF1 | 1→0 |
| Q of FF2 | 0→0, | $\overline{Q}$ of FF2 | 1→1 |
| AND1 | 1→0, | AND2 | 0→0 |
| Terminal a | 1→0, | Terminal b | 0→1 |
| Terminal c | 0→0 | | |

Therefore, the pulses from digital detecting device 1 are supplied again to pulse decreasing device 4 after point $A_2$ has been detected.

At point $B_2$:

| $D_1$ | 0, | $D_2$ | 1 |
|---|---|---|---|
| Q of FF1 | 1→0, | $\overline{Q}$ of FF1 | 0→1 |
| Q of FF2 | 0→1, | $\overline{Q}$ of FF2 | 1→0 |
| AND1 | 0→0, | AND2 | 0→1 |
| Terminal a | 0→0, | Terminal b | 1→0 |
| Terminal c | 0→1 | | |

Thus, the supply of the pulses from digital detecting device 1 to either of counting device 3 and pulse decreasing device 4 is stopped after point $B_2$ has been detected.

Since the number of pulses counted by counting device 3 within the range between $A_1$, $B_1$ as well as the range between $A_2$, $B_2$ is reduced to half the number of pulses generated by digital detecting device 1 within the above respective ranges, the content of counting device 3 is made to correspond to the center distance between points $O_1$, $O_2$.

Figure 9:
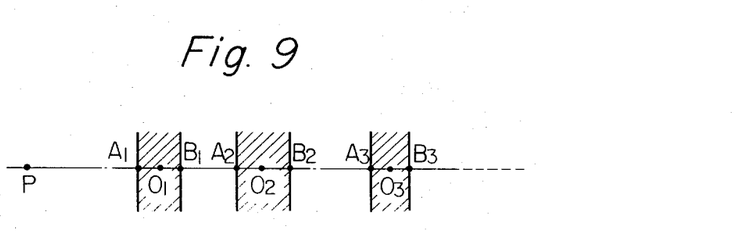
FIG. 9 is a diagram showing the process for determining the coordinate value each of the centers of a plurality of strip-shaped areas having symmetrical configuration.

By combining several elements with the above described digital measuring system, the position of the center each of a plurality of sets of two measuring points as shown in FIG. 9 can be determined successively in accordance with a further feature of the present invention.

Figure 10:
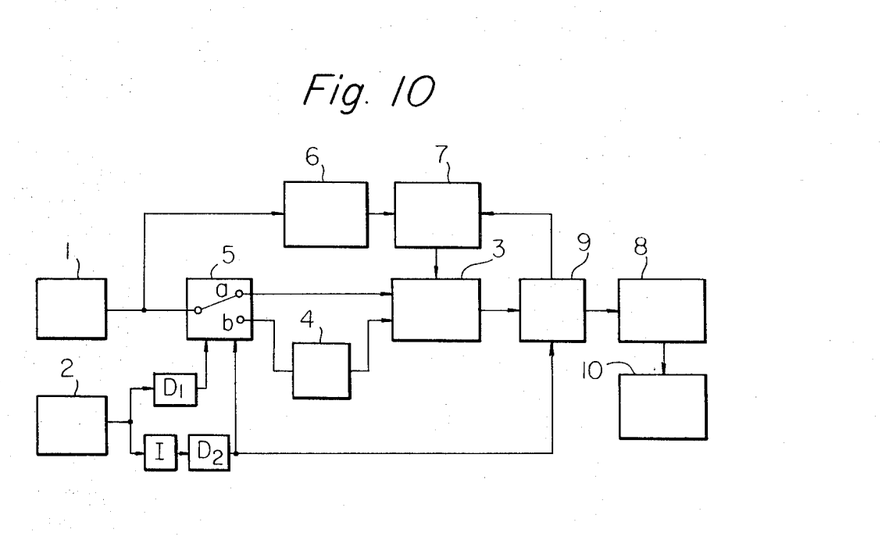
FIG. 10 is a block diagram showing a further embodiment of the digital measuring system of the present invention for determining the coordinate value each of the centers of a plurality of areas having symmetrical configuration shown in FIG. 9.

FIG. 10 shows an embodiment of the above described system for successively determining the position of centers $O_1$, $O_2$, $O_3$—of the respective sets of two measuring points $A_1$, $B_1$; $A_2$, $B_2$, $A_3$, $B_3$—in FIG. 9. In FIG. 10, elements designated by numerals 1 to 5 inclusive are similar to those shown in FIG. 4. The system of FIG. 10 further comprises a further counting device 6 directly connected to the output of digital detecting device 1 so as to count the pulses from digital detecting device 1 at all times during the measuring operation, a counting control circuit 7 connected to counting device 6 and counting device 3, a register control circuit 9 connected to counting device 3 and second differential circuit $D_2$ with the output thereof connected to counting control circuit 7, a registering device 8 connected to register control circuit 9 for storing the content of counting device 3, and a recording printer device 10 connected to registering device 8 for recording the content of registering device 8 supplied thereto.

Register control circuit 9 is so actuated that the content of counting device 3 is supplied to registering device 8 through register control circuit 9 when a pulse from second differential circuit $D_2$ is applied thereto so that the thus supplied content is recorded in printer device 10 through registering device 8. At the same time, the output of register control circuit 9 supplied to counting control circuit 7 when register control circuit 9 is actuated causes the content of counting device 6 to be supplied to counting device 3 so as to be stored therein.

At reference point P of the measurement, both counting devices 3, 6 are reset to zero while gate circuit 5 is switched so that an output is generated at first output terminal $a$. After the measurement has been commenced at point P so as to permit the pulses from digital detecting device 1 to be supplied to counting device 3, gate circuit 5 is switched to generate an output at second output terminal $b$ when point $A_1$ is detected so that the output pulses of pulse decreasing device 4 are supplied to counting device 3, while the output pulses from digital detecting device 1 are directly supplied to counting device 6. At point $B_1$, gate circuit 5 is again switched to generate an output at first terminal $a$ and, at the same time, register control circuit 9 is actuated so as to cause the content of counting device 3 to be stored in registering device 8 so that the same is recorded in printer device 10. The thus recorded content corresponds to $\overline{PO_1}$ indicative of the position of center $O_1$ with respect to reference point P. The output of register control circuit 9 supplied to counting control circuit 7 causes the content of counting device 6 to be transferred to counting device 3 at the moment the storing of the content of counting device 3 in registering device 8 has been completed. The content of counting device 6 thus transferred to counting device 3 corresponds to $\overline{PB_1}$ indicative of the position of $B_1$ with respect to point P. Therefore, the position of centers $O_2$, $O_3$—are successively recorded in printer device 10 by repeating the above described procedure.

Figure 11:
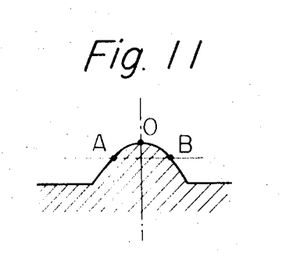
FIG. 11 is a diagram showing the process for determining the coodinate value of the top of a protruded area.
Figure 12:
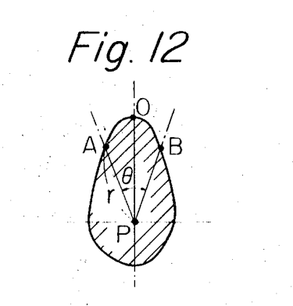
FIG. 12 is a diagram showing the process for determining the coordinate value of the top of a cam having symmetrical configuration.

FIGS. 11 and 12 show examples for determining the position of the center, i.e., the top of a projecting area or a cross section of a cam having a symmetrical configuration. In FIG. 11, the position of top O is determined by detecting the positions of two points A, B located symmetrically at each side of top O, while, in FIG. 12, the position of top O is determined by detecting the positions of two points A, B symmetrically located angularly at each side of top O around axis of rotation P of the cam. In detecting the positions of points A, B, gate circuit 5 is so controlled that a pulse is generated when radii of points A, B, i.e., the distance $\overline{AP}$, $\overline{BP}$ coincide with a predetermined radius r as the cam is rotated around axis of rotation P.

We claim:

1. Digital measuring system for determining the position of the center of two specifically set measuring points in an object to be successively detected during the measuring operation, said system having a digital detecting device which generates pulses during the measuring operation and a counting device which receives said pulses from said digital detecting device so as to count said pulses so that the value to be measured is determined by the number of pulses counted thereby, wherein the improvement comprises a measuring point detecting device which generates a first pulse when the preceding one of said two measuring points is detected thereby while a second pulse is generated by said measuring point detecting device when the succeeding one of said two measuring points is detected thereby, a gate circuit connected to the output of said digital detecting device and the output of said measuring point detecting device and having a first, a second and a third output terminal, and a pulse decreasing device adapted to erase alternating pulses in the series of input pulses received thereby so as to generate output pulses the number of which is reduced to half the number of said input pulses received thereby, said first output terminal of said gate circuit being directly connected to the input of said counting device while said second output terminal is connected to said counting device through said pulse decreasing device with said third output terminal being kept disconnected from either of said counting device and said pulse decreasing device, said gate circuit being so controlled by said measuring point detecting device that the output pulses from said digital detecting device are directly supplied through said first terminal to said counting device so as to be counted thereby when the measuring operation is commenced at a predetermined reference point with said counting device being reset to zero while said output pulses are switched to be supplied to said counting device through said second terminal and said pulse decreasing device when said first pulse from said measuring point detecting device is supplied to said gate circuit so that the output pulses of said pulse decreasing device are counted by said counting device, the supply of said output pulses from said digital detecting device through said second terminal and said pulse decreasing device to said counting device being stopped by said second pulse generated by said measuring point detecting device and supplied to said gate circuit, thereby permitting the position of the center of said two measuring points to be determined by the number of pulses received and counted by said counting device.

2. System according to claim 1, wherein said gate circuit comprises a first differential circuit connected to said measuring point detecting device, an inverter circuit and a second differential circuit connected in series to said inverter circuit, said inverter circuit being connected to said measuring point detecting device, a first and second flip-flop circuits each having a setting and a resetting input terminals and a first and second output terminals so that an output is generated at said first output terminal when an input is applied to said setting input terminal with said second output terminal being kept zero while an output is generated at said second output terminal and the output at said first output terminal is made zero when an input is applied to said resetting input terminal, said setting input terminal of said first flip-flop circuit being connected to the output of said first differential circuit while said resetting input terminal thereof is connected to the output of said second differential circuit, said setting input terminal of said second flip-flop circuit being connected to the output of said second differential circuit, resetting means connected to said resetting input terminal of each of said first and second flip-flop circuits, and a first and second AND circuits, said second output terminal of said first flip-flop circuit being connected to said first and second AND circuits while said first output terminal of said second flip-flop circuit is connected to said second AND circuit and said second output terminal thereof is connected to said first AND circuit, the output of said first AND circuit being connected to said first output terminal of said gate circuit and the output of said second AND circuit is connected to said third output terminal thereof while the output of said first output terminal of said first flip-flop circuit being connected to said second output terminal of said gate circuit.

3. Digital measuring system for setting an origin in the measurement to the center of two specifically set measuring points in an object to be successively detected during the measuring operation, said system having a digital detecting device which generates pulses during the measuring operation and a counting device which receives said pulses from said digital detecting device so as to count said pulses so that the value to be measured is determined by the number of pulses counted thereby, wherein the improvement comprises a measuring point detecting device which generates a first pulse when the preceding one of said two measuring points is detected thereby while a second pulse is generated by said measuring point detecting device when the succeeding one of said two measuring points is detected thereby, a gate circuit connected to the output of said digital detecting device and the output of said measuring point detecting device and having a first, a second and a third output terminal, and a pulse decreasing device adapted to erase alternating pulses in the series of input pulses received thereby so as to generate output pulses the number of which is reduced to half the number of said input pulses received thereby, said first output terminal of said gate circuit being directly connected to the input of said counting device while said second output terminal is connected to said counting device through said pulse decreasing device with said third output terminal being kept disconnected from either of said counting device and said pulse decreasing device, said gate circuit being so controlled by said measuring point detecting device that the output pulses from said digital detecting device is supplied to said third output terminal when the measuring operation is commenced at a reference point with said counting device being reset to zero thereby keeping the same inoperative, while said output pulses are supplied through said second output terminal and said pulse decreasing device to said counting device when said first pulse from said measuring point detecting device is supplied to said gate circuit thereby permitting the output pulses from said pulse decreasing device to be counted by said counting device, the output pulses of said digital detecting device being switched to be supplied directly to said counting device through said first output terminal of said gate circuit when said second pulse from said measuring point detecting device is supplied to said gate circuit thereby permitting the origin in the measurement to be set to the center of said two measuring points by virtue of the fact that the number of pulses supplied from said pulse decreasing device to said counting device and counted thereby within the range between said two measuring points is reduced to half the number of pulses supplied from said digital detecting device within said range while no pulses are supplied to said counting device until the preceding one of said two measuring points is detected, the output pulses from said digital detecting device being directly supplied to said counting device after the succeeding one of said two measuring points has been detected.

4. Digital measuring system according to claim 3 for determining the distance between the center of a first set of two measuring points and the center of a second set of two measuring points in which the origin in the measurement is set to the center of said first set of two measuring points wherein the improvement comprising the fact that said gate circuit is controlled by said measuring point detecting device such that the output pulses from said digital detecting device are switched to be supplied to said second output terminal of said gate circuit when the preceding one of the two measuring points in said second set is detected by said measuring point detecting device so as to generate a first pulse therein to be supplied to said gate circuit after the succeeding one of of the two measuring points in said first set has been detected by said measuring point detecting device thereby supplying the output pulses from said pulse decreasing device to said counting device, the output pulses from said digital detecting device being switched to be supplied to said third output terminal of said gate circuit when the succeeding one of the two measuring points in said second set is detected thereby stopping the supply of the output pulses from said digital detecting device to either of said counting device and said pulse decreasing device so that the measurement is terminated when the number of pulses indicative of the center of the two measuring points in said second set has been supplied to said counting device by virtue of the fact that the number of pulses supplied to said counting device through said pulse decreasing device within the range between the two measuring points in said second set is reduced to half the number of pulses from said digital detecting device within said range.

5. System according to claim 4, wherein said gate circuit comprises a first differential circuit connected to said measuring point detecting device, a converter circuit and a second differential circuit connected in series to said converter circuit, said converter circuit being connected to said measuring point detecting device, a first flip-flop circuit having a setting input terminal, a resetting input terminal and a first and second output terminals, an output being generated at said first output terminal when an input is supplied to said setting input terminal with said second output terminal being kept zero while an output is generated at said second output terminal and the output at said first output terminal is made zero when an input is applied to said resetting input terminal, a second flip-flop circuit having a setting input terminal, an inverting input terminal and a first and second output terminals, an input being generated at said first output terminal of said second flip-flop circuit when an input is applied to said setting input terminal thereof with said second output terminal being kept zero, said second flip-flop circuit being inverted each time an input is applied to said inverting input terminal thereby alternately generating an output at said first and said second output terminal, said setting input terminal of said first flip-flop circuit being connected to said first differential circuit while said resetting input terminal of said first flip-flop circuit and said inverting input terminal of said second flip-flop circuit are connected to said second differential circuit, resetting means being connected to said resetting input terminal of said first flip-flop circuit and said setting input terminal of said second flip-flop circuit, and a first and a second AND circuit, said second output terminal of said first flip-flop circuit being connected to said first and second AND circuits while said first output terminal of said second flip-flop circuit is connected to said second AND circuit and said second output terminal of said second flip-flop circuit is connected to said first AND circuit, the output of said first AND circuit and the output of said second AND circuit being connected to said first and said third output terminal of said gate circuit while said first output terminal of said first flip-flop circuit is connected to said second output terminal of said gate circuit.

6. Digital measuring system according to claim 2 for determining the position of the center each of a plurality of sets of two measuring points to be successively detected during the measuring operation in which the position of the center of the two measuring points of a first set in said plurality of sets is determined, wherein the improvement comprises a further counting device connected to said digital detecting device adapted to count the output pulses from said digital detecting device at all times during the measuring operation regardless of the operation of said gate circuit, a counting control circuit connected to said further counting device and said counting device controlled by said gate circuit so as to transmit the content of said further counting device to said counting device controlled by said gate circuit at a given time, a register control circuit with the inputs thereof being connected to the output of said counting device controlled by said gate circuit and the output of said second differential circuit while one of the outputs is connected to said counting control circuit, a registering device connected to the other of the outputs of said register control circuit for storing the content of said counting device controlled by said gate circuit, and a recording printer device connected to said registering device for recording the content of said registering device, said gate circuit and said register control circuit being so controlled by said measuring point detecting device that the output pulses from said digital detecting device are supplied through said first output terminal of said gate circuit to said counting device controlled by said gate circuit with said further counting device being supplied with output pulses directly from said digital detecting device when the measuring operation is commenced at a predetermined reference point with said counting device and said further counting device being reset to zero, the output pulses from said digital detecting device being switched to be supplied through said second output terminal of said gate circuit and said pulse decreasing device to said counting device while said further counting device is supplied with the output pulses directly from said digital detecting device when said first pulse is supplied from said measuring point detecting device to said gate circuit upon detecting the preceding one of the two measuring points of the first set in said plurality of sets, the output pulses from said digital detecting device being switched to be supplied directly to said counting device through said first output terminal of said gate circuit while said register control circuit is actuated simultaneously with the switching of the output pulses from said second output terminal to said first output terminal so as to transmit the content of said counting device to said registering device so as to store the same therein and record the same in said recording printer device when said second pulse is applied to said gate circuit from said measuring point detecting device upon detection of the succeeding one of the two measuring points in said first set, said register control circuit further supplying to said counting control circuit a demand upon completion of the storing of the content of said counting device in said registering device so as to transmit the content of said further counting device to said counting device controlled by said gate circuit, the content recorded in said recording printer device being indicative of the position of the center of the two measuring points in said first set of said plurality of sets while the content transmitted from said further counting device to said counting device controlled by said gate circuit is indicative of the position of the succeeding one of the two measuring points of said first set thereby permitting the position of the center of two measuring points in the respective succeeding sets to be successively indicated in said recording printer device by repeating the above procedure.